(12) United States Patent
Murase

(10) Patent No.: US 7,603,925 B2
(45) Date of Patent: Oct. 20, 2009

(54) PARKING BRAKE DEVICE

(75) Inventor: Mikio Murase, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 211 days.

(21) Appl. No.: 11/414,096

(22) Filed: Apr. 28, 2006

(65) Prior Publication Data

US 2006/0260882 A1   Nov. 23, 2006

(30) Foreign Application Priority Data

May 18, 2005   (JP) .......................... P2005-145646

(51) Int. Cl.
*B60K 20/00* (2006.01)
(52) U.S. Cl. ................................. 74/473.16
(58) Field of Classification Search ..................... 74/33, 74/34, 120, 471 R, 473.16, 473.17, 473.3, 74/519, 523, 526, 528
See application file for complete search history.

(56) References Cited

U.S. PATENT DOCUMENTS

| 1,996,263 | A |   | 4/1935 | Troutman |
| 5,443,131 | A | * | 8/1995 | Bartlett ........................ 188/3 R |
| 5,890,545 | A | * | 4/1999 | Smith et al. .................. 172/200 |
| 6,196,357 | B1 |   | 3/2001 | Tomura |
| 6,305,238 | B1 |   | 10/2001 | Gabas |
| 2002/0007991 | A1 |   | 1/2002 | Grundke |

FOREIGN PATENT DOCUMENTS

| DE |   | 203 09 134 U1 |   | 8/2003 |
| JP |   | 09254770 A | * | 9/1997 |
| JP |   | 2004-230986 |   | 8/2004 |

OTHER PUBLICATIONS

European Search Report dated Aug. 30, 2006.
Korean Office Action dated Mar. 30, 2007 issued by Korean Patent Office for application No. 2006-44425 with Japanese translation.

* cited by examiner

*Primary Examiner*—Vicky A Johnson
(74) *Attorney, Agent, or Firm*—Locke Lord Bissell & Liddell, LLP

(57) ABSTRACT

A parking brake device for a vehicle includes a lever bracket, a brake lever, a brake mechanism, a plurality of brake cables and a link mechanism. The lever bracket is fixedly located near a driver seat of the vehicle body. The brake lever is tiltably supported by the lever bracket. The brake mechanism controls rotation of a drive system shaft member in the vehicle body. The brake cables operate the brake mechanism by tilting motion of the brake lever. Pull length of each brake cable caused by the tilting motion of the brake lever is set in a predetermined range. The link mechanism is connected to the brake lever so as to be displaced by the tilting motion of the brake lever. The link mechanism holds one end of each of the brake cables. The brake cables simultaneously operate the brake mechanism by the tilting motion of the brake lever.

5 Claims, 6 Drawing Sheets

PARKING BRAKE DEVICE

BACKGROUND OF THE INVENTION

The present invention relates to a parking brake device mounted on a vehicle, and more particularly to a parking brake device using a brake cable.

FIGS. 5A and 5B show an example of prior art parking brake device. A parking brake device 80 mounted on a forklift truck includes a lever bracket 81, a brake lever 82, a brake mechanism 86 and a brake cable 83. The lever bracket 81 is fixedly located near a driver seat of a body of the vehicle. The brake lever 82 is tiltably supported by the lever bracket 81 and has an actuating portion at one end. The brake mechanism 86 controls rotation of a drive system shaft member in the vehicle body. The brake cable 83 operates the brake mechanism 86 by tilting motion of the brake lever 82.

In the above parking brake device 80, the brake lever 82 and the brake mechanism 86 are connected by the brake cable 83 in such a manner that a braking state and a releasing state of the brake mechanism 86 are switched by the tilting motion of the brake lever 82. The brake cable 83 generally includes a cylindrical outer casing 84 and an inner cable 85 which extends through the outer casing 84. The outer casing 84 is mounted on the vehicle body, such as the lever bracket 81 and the bracket near the brake mechanism 86. One end of the inner cable 85 is held by the brake lever 82 and the other end thereof is held by a lever 87 of the brake mechanism 86. In this structure, the inner cable 85 is slidably moved along the outer casing 84 by the tilting motion of the brake lever 82 thereby to pull the lever 87, with the result that the brake mechanism 86 becomes the braking state.

FIG. 6 shows another example of prior art parking brake device. A parking brake device 90 includes a brake mechanism having brake portions provided near right and left wheels, respectively. For the sake of convenience, only a brake portion 98 near the left wheel is shown in FIG. 6 and the other brake portion near the right wheel is not shown. The parking brake device 90 is so formed that a braking state and a releasing state of each brake portion are switched simultaneously on both right and left sides by tilting motion of a brake lever 92 of a lever bracket 91. Thus, two brake cables 93, each of which has an outer casing 94 and an inner cable 95, are used in the parking brake device 90. Specifically, the parking brake device 90 includes a link member 96 and an equalizer member 97. One end of the link member 96 is connected to the brake lever 92 and the other end thereof is connected to the equalizer member 97 which holds the ends of the inner cables 95.

The other ends of the inner cables 95 which are connected to the equalizer member 97 are distributed into the right and left brake portions. For example, one of the inner cables 95 is connected to a lever 99 of the left brake portion 98. One end of each outer casing 94 is fixed to the lever bracket 91 and the other end thereof is fixed to a bracket near the corresponding brake portion. For example, one of the outer casings 94 is connected to a bracket 100 of the left brake portion 98. Since the two brake cables 93 are the same structure, the right and left brake portions are simultaneously operated through the two brake cables 93 by the tilting motion of the brake lever 92.

In the above parking brake devices, when tensile force is exerted on the brake cable, while the inner cable of the brake cable tends to elongate, the outer casing of the brake cable tends to shrink. Therefore, when the inner cable is pulled, for example, by tilting motion of the cable lever, pull length of the inner cable on the brake lever side does not coincide with that of the inner cable on the brake mechanism side. Specifically, the pull length of the inner cable on the brake mechanism side is reduced thus causing stroke loss of the pull length. In particular, when the pull length of the inner cable caused by tilting motion of the brake lever is set at a predetermined length as in the case of toggle type brake lever, a remarkable increase of the stroke loss causes the pull length of the inner cable needed for operating the brake mechanism to be reduced. Therefore, there is fear that the parking brake device may not function normally.

Meanwhile, for example, in a brake mechanism of a drum brake having a clearance between its brake drum and its brake shoe, pull length of an inner cable of the brake cable is distributed into a range in which the brake shoe fills up the clearance to be brought into contact with the brake drum and a range in which the brake shoe applies load to the brake drum after being brought in contact with the brake drum. When the pull length of the inner cable is set at a predetermined length, the above stroke loss reduces the clearance between the brake shoe and the brake drum. To cancel the stroke loss, the rigidity of the brake cable is conventionally enhanced by merely increasing the diameter of the brake cable.

Japanese Patent Application Publication (KOKAI) No. 2004-230986 discloses an auxiliary brake device for a parking brake device. This auxiliary brake device includes an auxiliary brake pedal supported by an operation bracket on a passenger seat side and a lever supported by an operation bracket on a driver seat side for pushing another brake pedal. Additionally, the auxiliary brake device includes transmission means for transmitting force for pushing the auxiliary brake pedal to the above lever. The transmission means includes two cables which are juxtaposed to each other. The auxiliary brake device is so formed that the brake pedal is pushed through the cables and the lever by pushing the auxiliary brake pedal.

When the diameter of each brake cable of the above parking brake devices is increased, however, there is a problem that installation space needed for disposing the brake cable is increased. Depending on the type of the vehicle, the installation space for disposing the brake cable having relatively large diameter may not be sufficiently ensured. When the diameter of the brake cable is increased to enhance the rigidity of the brake cable, it becomes hard to bend the brake cable. For example, operation for bending the brake cable to dispose the brake cable in the vehicle body tends to be hindered.

Although the above auxiliary brake device uses a plurality of brake cables to enhance the rigidity in the entirety of the brake cables without increasing the diameter of each brake cable, the auxiliary brake device does not disclose the brake cables which connect a brake portion with a brake lever. In other words, the auxiliary brake device merely discloses two cables for transmitting force for pushing the auxiliary brake pedal to the lever. In addition, when pull length of the brake cable is set at a predetermined length, the auxiliary brake device does not disclose the solution of the problem on a brake mechanism side caused by stroke loss.

SUMMARY OF THE INVENTION

The present invention is directed to a parking brake device capable of not only enhancing the rigidity of a brake cable without increasing the diameter of the brake cable but also solving a problem in a brake mechanism despite pull length of the brake cable set in a predetermined range.

In accordance with an aspect of the present invention, a parking brake device includes a lever bracket, a brake lever, a brake mechanism, a plurality of brake cables and a link mechanism. The lever bracket is fixedly located near a driver seat of a body of the vehicle. The brake lever is tiltably supported by the lever bracket and has an actuating portion. The brake mechanism controls rotation of a drive system shaft member in the body of the vehicle. The brake cables operate the brake mechanism by tilting motion of the brake lever. Pull length of each brake cable caused by the tilting motion of the brake lever is set in a predetermined range. The link mechanism is connected to the brake lever so as to be displaced by the tilting motion of the brake lever. The link mechanism holds one end of each of the brake cables. Each of the brake cables simultaneously operates the brake mechanism by the tilting motion of the brake lever.

It is not intended that the invention be summarized here in its entirety. Rather, other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description, together with the accompanying drawings, in which:

DETAILED DESCRIPTION OF THE PREFERRED EMBODIMENTS

Figure 1A:
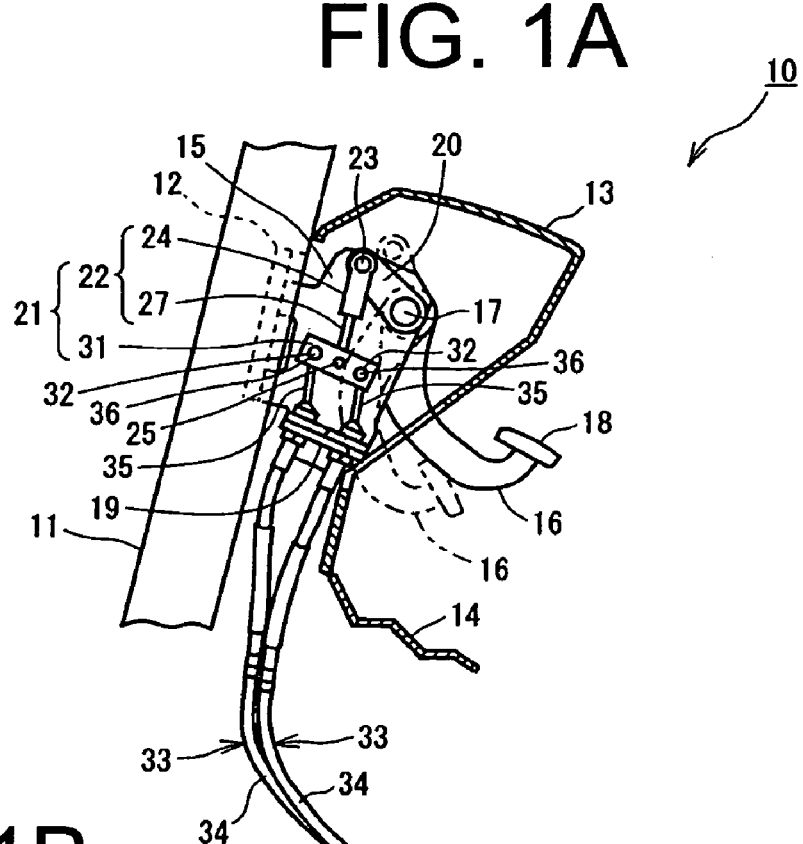
FIG. 1A is a side view showing a parking brake device according to a first preferred embodiment of the present invention.
Figure 1B:
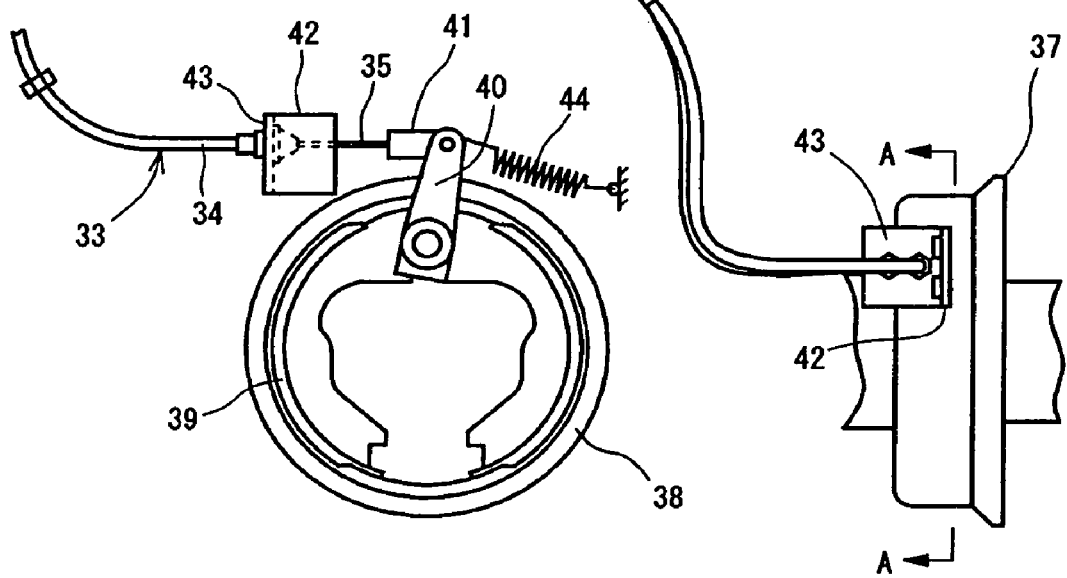
FIG. 1B is a fragmentary view taken in the direction of the arrows substantially along the line A-A of FIG. 1A.

The following will describe a parking brake device 10 according to a first preferred embodiment of the present invention with reference to FIGS. 1A, 1B, 2 and 3. The parking brake device 10 of the present embodiment is applied to a forklift truck that serves as a vehicle, and mainly includes a lever bracket 15, a brake lever 16, a brake mechanism 37, two brake cables 33 and a link mechanism 21.

The lever bracket 15 is formed, for example, by pressing metal plate and is mounted on a connection member 12 which laterally connects front pillars 11 of the vehicle body (only one pillar 11 is shown in FIG. 1A), and is located near a driver seat of the forklift truck. The driver seat side of the lever bracket 15 is covered by a dash panel 13 from the upper portion of the lever bracket 15 to the lower portion thereof. The driver seat side of the lower end of the dash panel 13 is provided with a toe board 14. The dash panel 13 separates a space in which a loading device (not shown) is disposed from a space on the driver seat side.

A supporting shaft 17 is tiltably supported by the lever bracket 15, and the brake lever 16 is mounted on the supporting shaft 17. The brake lever 16 extends from the supporting shaft 17 to the rear downward and projects from an opening formed in the dash panel 13 toward the driver seat. The projecting end of the brake lever 16 is provided with a pedal 18 that serves as an actuating portion. The brake lever 16 is bent laterally so as not to interfere with the lever bracket 15, so that a part of the brake lever 16 adjacent to the pedal 18 and a part of the brake lever 16 adjacent to the supporting shaft 17 are differently positioned in a width direction.

When the pedal 18 receives tread pressure, the pedal 18 is tilted toward the toe board 14. Although not shown in the drawings, mechanisms for maintaining or releasing a state where the pedal 18 is tilted toward the toe board 14 are provided in the parking brake device 10.

Figure 2:
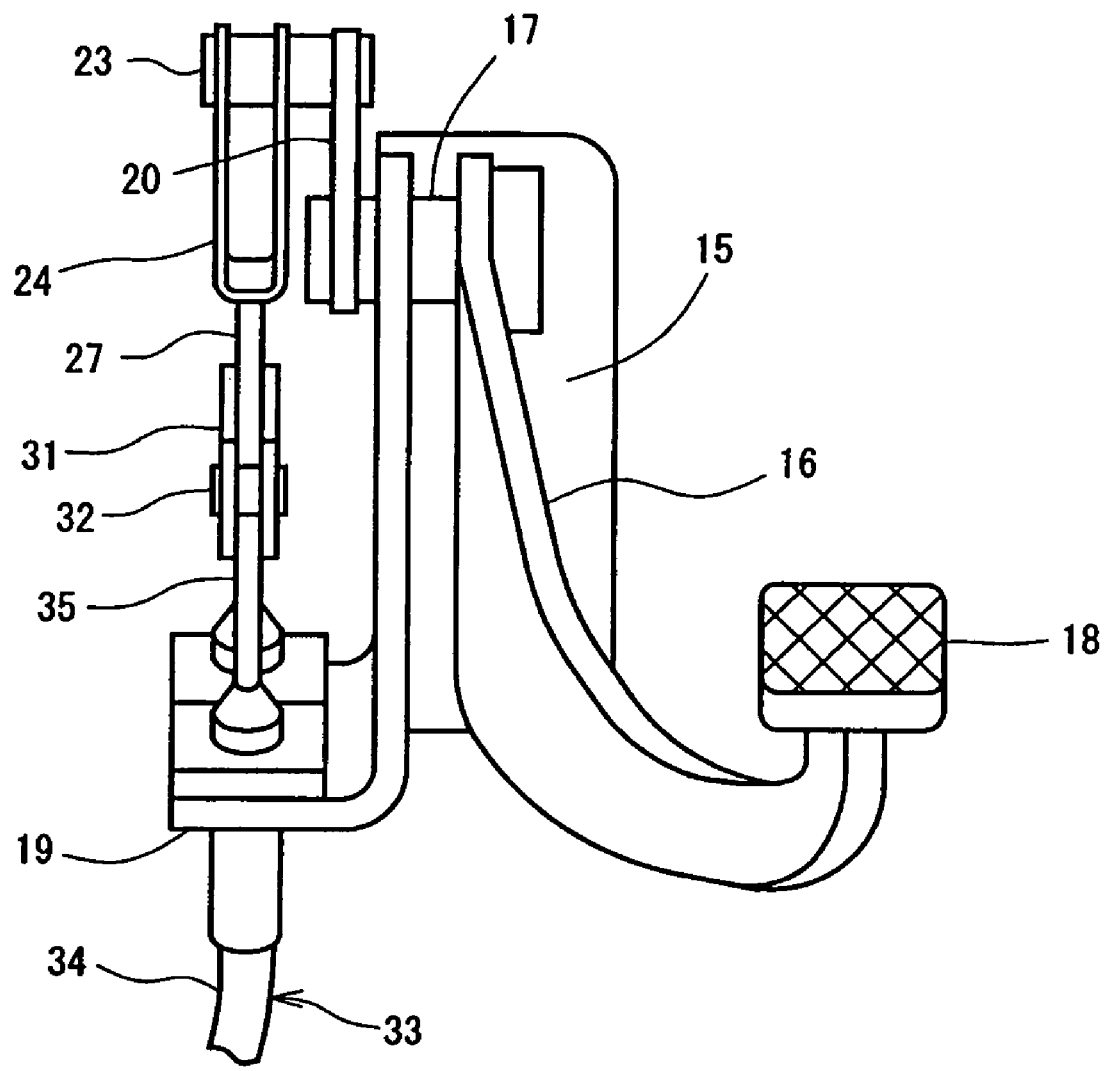
FIG. 2 is a front view showing a brake lever and its surrounding according to the first preferred embodiment of the present invention.

As shown in FIG. 2, a swing arm 20 is mounted on the supporting shaft 17 so as to locate outside the lever bracket 15. The swing arm 20 is swung by tilting motion of the brake lever 16. The swing end of the swing arm 20 is connected to a link member 22 which forms a part of the link mechanism 21.

The link mechanism 21 of the present embodiment includes the above link member 22 which is connected to the brake lever 16 and an equalizer member 31 which is connected to the link member 22. The link mechanism 21 is displaced by the swing motion of the swing arm 20 caused by the tilting motion of the brake lever 16. In addition, the link mechanism 21 is displaced upward or downward by the swing motion of the swing arm 20.

The link member 22 is interposed between the brake lever 16 and the equalizer member 31. The link member 22 includes a clevis 24 and a connecting beam 27. The clevis 24 is pivotally connected to the part of the brake lever 16 adjacent to the supporting shaft 17 through a pin 23. The connecting beam 27 is connected to the clevis 24 and is pivotally connected to the equalizer member 31 through a pin 25.

It is noted that when installation position in an axial direction of the connecting beam 27 for the clevis 24 or the equalizer member 31 is adjustably formed, the play of the brake is adjusted by adjusting an interval between the pins 23 and 25 in accordance with the installation position of the connecting beam 27.

The equalizer member 31 of the present embodiment forms the link mechanism 21 together with the link member 22. The equalizer member 31 is provided with two cable holding portions 32 so as to hold the ends of the two brake cables 33. In the present embodiment, an insertion hole for the pin 25 of the link member 22 is located at the middle of the distance between the cable holding portions 32. Thus, the pull force caused by the brake lever 16 is equally distributed into tensile force of two brake cables 33.

Figure 3:
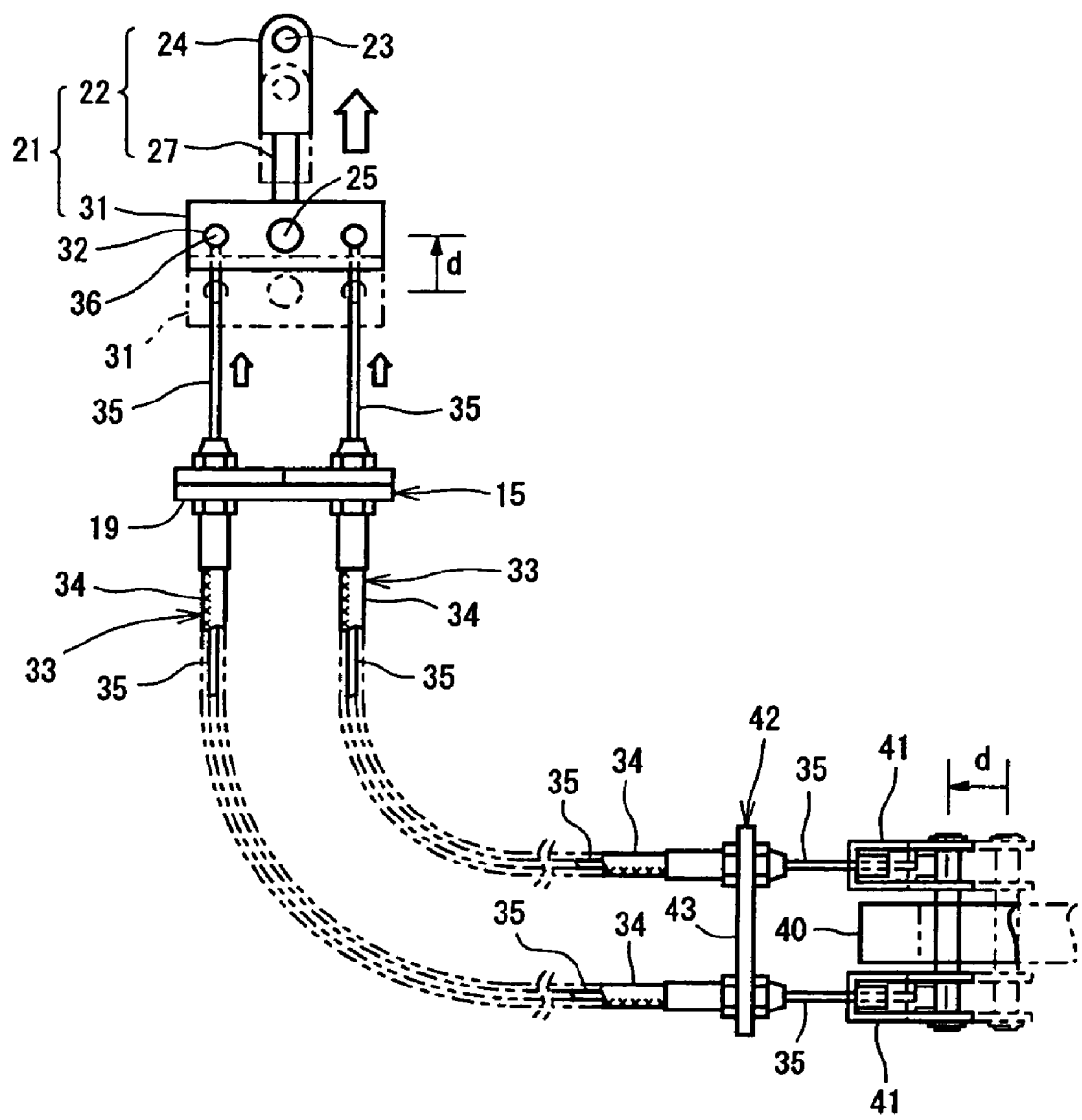
FIG. 3 is a schematic view showing an installation state of brake cables according to the first preferred embodiment of the present invention.

Now, operation of the brake cables 33 will be described. The brake cables 33 is a transmission member for transmitting the pull force caused by the tilting motion of the brake lever 16 to the brake mechanism 37. As shown in FIG. 3, each brake cable 33 includes a cylindrical outer casing 34 and an inner cable 35 which is inserted in the outer casing 34 so as to be slidably moved along the outer casing 34. The outer casing 34 is formed of resin material into a tubular shape and has an insertion hole in which the inner cable 35 is inserted. In the present embodiment, the opposite ends of each outer casing 34 are provided with metal fittings, respectively. One end of the outer casing 34 is fixed to an outer casing fixing portion 19 formed on the lever bracket 15 by the corresponding metal fittings so as to extend through the outer casing fixing portion 19. The other end of the outer casing 34 is fixed to an outer casing fixing portion 43 of a bracket 42 formed near the brake mechanism 37 by the corresponding metal fittings so as to extend through the outer casing fixing portion 43. Two outer casings 34 are fixed to the vehicle body at appropriate intervals.

Although in the present embodiment both outer casings 34 are passed from the lever bracket 15 to the brake mechanism 37 so as to be continuously juxtaposed to each other, both outer casings 34 do not need to be necessarily juxtaposed to each other. For example, when installation space for the brake cables 33 is restricted, in both outer casing fixing portions 19, 43 both outer casings 34 are juxtaposed to each other, and in the other portions both outer casings 34 are freely passed. For example, in the other portions both outer casings 34 are fixed to the vehicle body so as to pass different places from each other. In this case, it is preferable that the inner cables 35 are set at the same length.

Each inner cable 35 is a twisted wire cable, and is longer than the outer casing 34 so as to project from the opposite ends of the outer casing 34. The opposite ends of each inner cable 35 are provided with engaging portions 36, respectively. One end of the inner cable 35 is held by the corresponding cable holding portion 32 of the equalizer member 31, and the other end thereof is connected to the brake mechanism 37. In the present embodiment, as shown in FIG. 3, pull length d of the inner cable 35 caused by tilting motion of the brake lever 16 is set in a predetermined range. Each engaging portion 36 is freely attached to or removed from its cable holding portion 32 or the brake mechanism 37 to facilitate replacement of the brake cable 33.

The brake mechanism 37 controls rotation of a drive system shaft member in the vehicle body. In the present embodiment, a propeller shaft (not shown) which is located near the middle of the vehicle body serves as the drive system shaft member, and a drum brake which controls the rotation of the propeller shaft serves as the brake mechanism 37. As shown in FIG. 1, the brake mechanism 37 includes a brake drum 38 which is rotated integrally with the propeller shaft, a brake shoe 39 which is pressed against the brake drum 38, and a lever 40 which operates the brake shoe 39 so as to be pressed against or released from the brake drum 38. The lever 40 has cable holding portions 41 which hold the ends of the inner cables 35, respectively.

When tensile force is applied to the inner cables 35 to pull the lever 40, the brake shoe 39 is pressed against the brake drum 38, with the result that frictional force between the brake shoe 39 and the brake drum 38 causes a braking state of the propeller shaft. It is noted that since a spring 44 is connected to the lever 40 so as to urge the lever 40 in the opposite direction to the direction in which the inner cables 35 are pulled, when the inner cables 35 are released from the tensile force, the lever 40 is returned to an initial position.

Since the pull length d of each inner cable 35 is set in a predetermined range, the pull length d is distributed into a range in which the brake shoe 39 fills up the clearance between the brake shoe 39 and the brake drum 38 to be brought into contact with the brake drum 38 (for the sake of convenience this range is hereinafter referred to as a clearance range) and a range in which the brake shoe 39 applies load to the brake drum 38 after being brought in contact with the brake drum 38 (for the sake of convenience this range is hereinafter referred to as a load range).

Operation of the parking brake device 10 of the present embodiment will now be described. The case that the parking brake device 10 is switched from its releasing state to its braking state will now be described. When the brake pedal 18 receives tread pressure to tilt the brake lever 16, the swing end of the swing arm 20 is displaced upward and the link mechanism 21 connected to the swing arm 20 is pulled by the brake lever 16, accordingly. The pull force of the brake lever 16 pulls the inner cables 35 toward the brake pedal 16 through the link mechanism 21, thereby pulling the lever 40 of the brake mechanism 37.

When the pull force of the brake lever 16 is transmitted to the equalizer member 31 through the link member 22, the pull force of the brake lever 16 is equally distributed into the tensile force of two inner cables 35. When the lever 40 is pulled, the brake shoe 39 is first brought into contact with the brake drum 38. When the lever 40 is further pulled, the brake shoe 39 is then pressed against the brake drum 38.

Although of the pull length d of the brake cable 33 of the present embodiment the magnitude of the pull force caused by the tilting motion of the brake lever 16 is not so large in the clearance range in which the brake shoe 39 is merely in contact with the brake drum 38, the magnitude of the pull force becomes relatively large in the load range in which the brake shoe 39 is pressed against the brake drum 38. In the first embodiment where the relatively large pull force corresponding to the load range is applied to the inner cables 35, the pull force is equally distributed into tensile force of two inner cables 35, thereby preventing the application of excessive tensile force to each inner cable 35. Consequently, elongation of the inner cables 35 caused by the excessive tensile force and shrinkage of the outer casings 34 caused by the tensile force are prevented.

The parking brake device 10 of the present embodiment has the following beneficial effects.

(1) Since two brake cables 33 are arranged so as to connect the link mechanism 21 which is pivotally connected to the brake lever 16 to the brake mechanism 37, the tensile force of the brake lever 16 is equally distributed into the tensile force of the two brake cables 33 through the link mechanism 21. Compared to the case where a single brake cable 33 is used, the rigidity in the entirety of the brake cables 33 is enhanced thereby to prevent the stroke loss.

(2) Since the stroke loss is prevented, for example, problem of the brake mechanism 37 caused by the stroke loss is prevented despite the pull length d of each brake cable 33 set in a predetermined range.

(3) Compared to the case where the diameter of the brake cable 33 is increased to enhance the rigidity of the brake cable 33, installation space needed for the brake cables 33 of the present embodiment is reduced. In addition, since each brake cable 33 is easily bent, the brake cable 33 is easily installed.

(4) Since the pull force of the brake lever 16 is distributed into the tensile force of two brake cables 33, elongation caused by the tensile force of the inner cables 35 and shrinkage of the outer casings 34 are prevented. Therefore, compared to the case where a single brake cable 33 is used, elongation caused by the tensile force of the inner cables 35 and stroke loss caused by shrinkage of the outer casings 34 are prevented.

(5) Since two brake cables 33 are used in the present embodiment, for example, in both outer casing fixing portions 19, 43 both outer casings 34 are juxtaposed to each other, and in the other portions both outer casings 34 are fixed to the vehicle body so as to pass different places from each other. Thus, even when installation space for the brake cables 33 is restricted, the brake cables 33 are installed in the vehicle body.

(6) Since two brake cables 33 are used in the present embodiment, even when one of the brake cables 33 does not function normally, the brake mechanism 37 is operated by the other brake cable 33.

Figure 4:
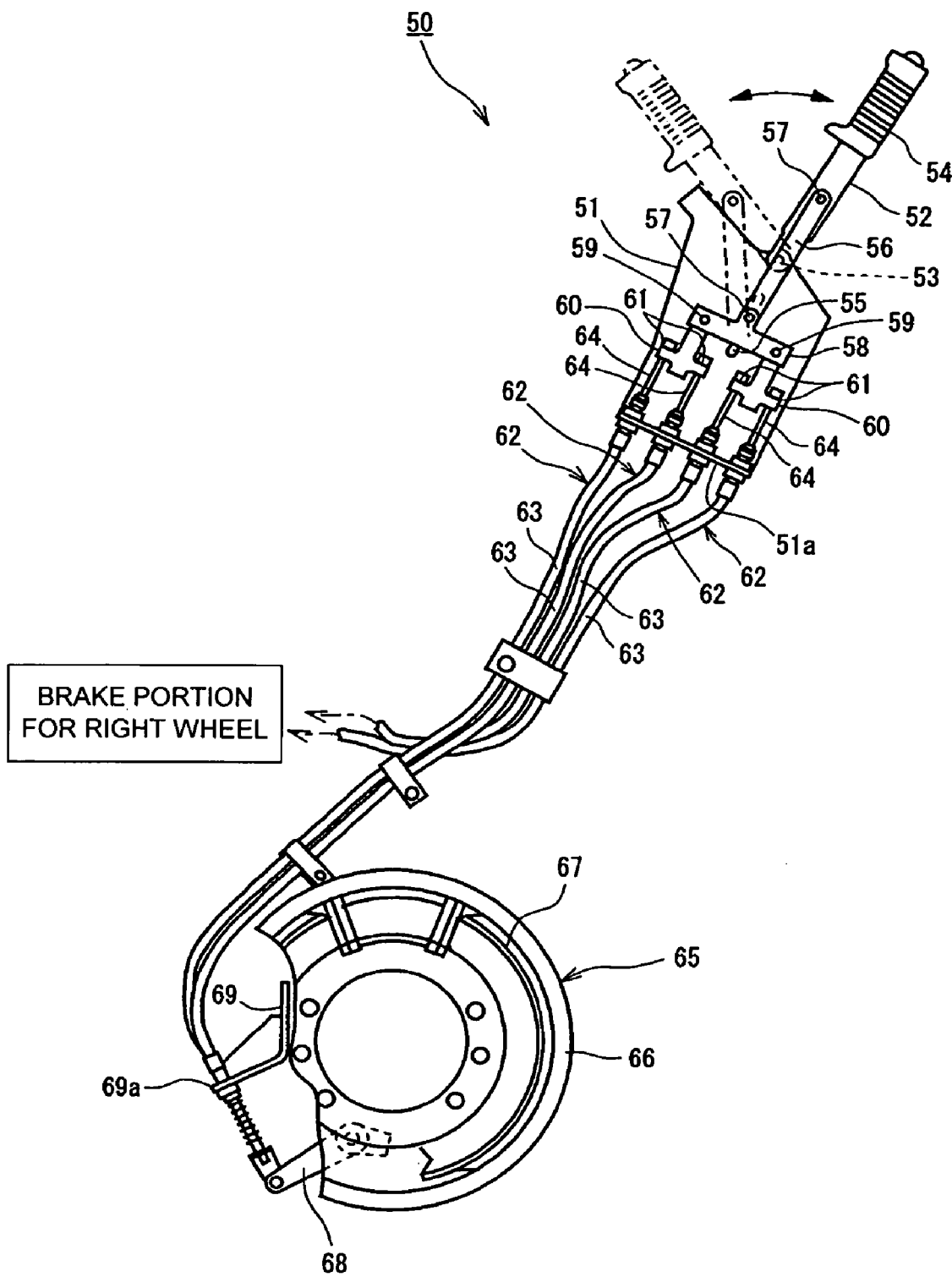
FIG. 4 is a side view showing a parking brake device according to a second preferred embodiment of the present invention.
Figure 5A:
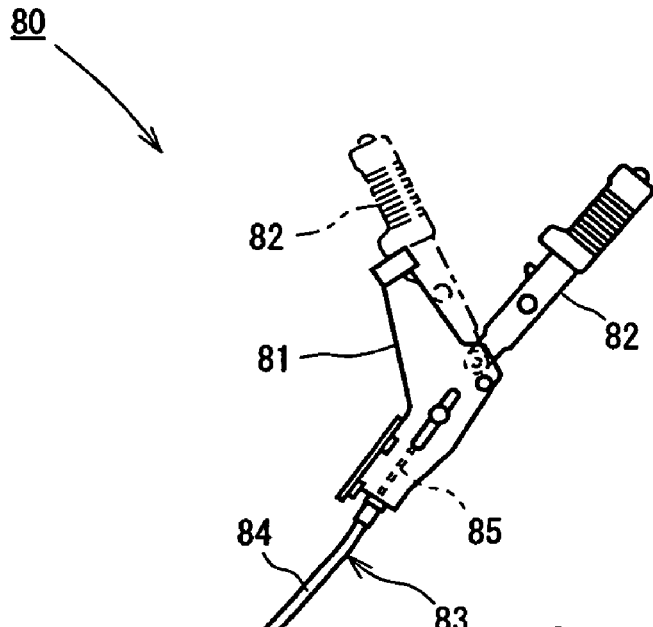
FIG. 5A is a side view showing a prior art parking brake device.
Figure 5B:
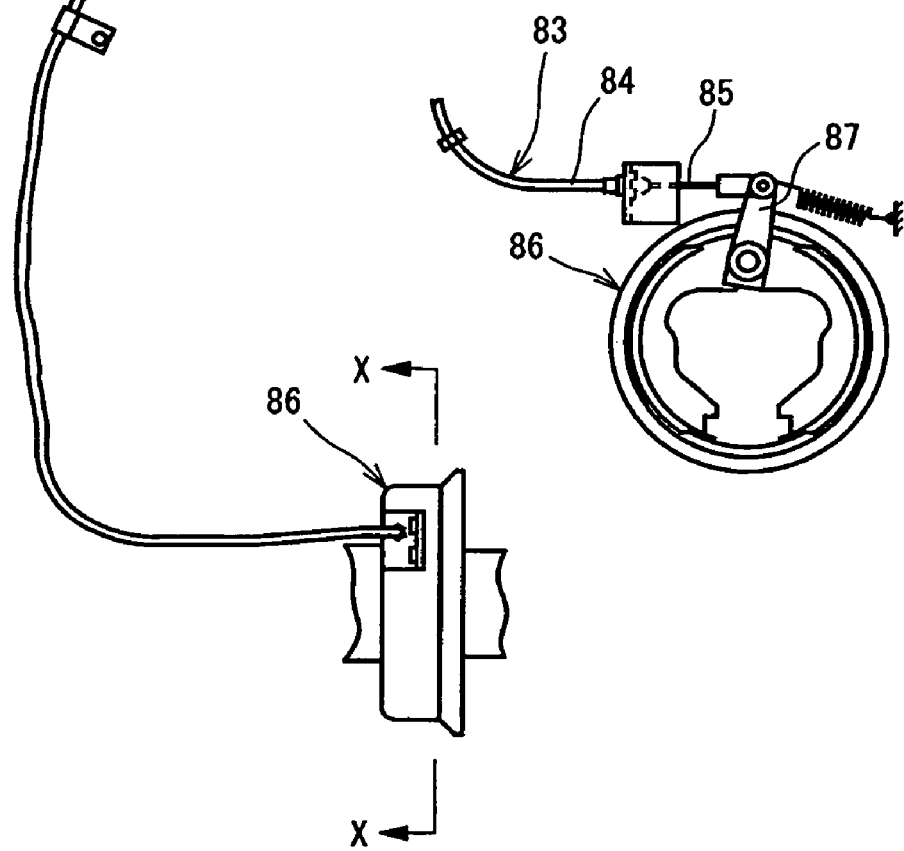
FIG. 5B is a fragmentary view taken in the direction of the arrows substantially along the line X-X of FIG. 5A.
Figure 6:
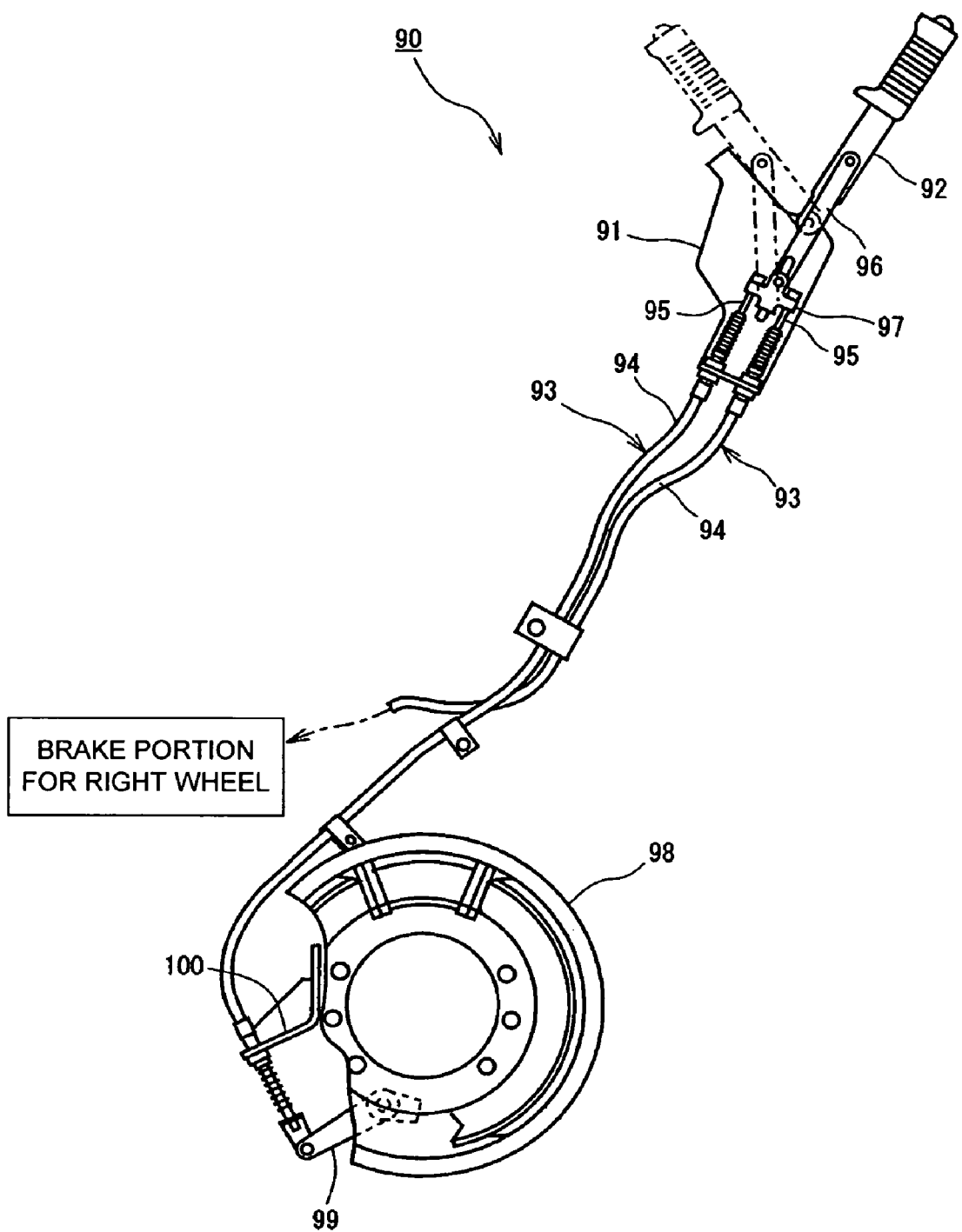
FIG. 6 is a side view showing another prior art parking brake device.

The following will describe a parking brake device 50 according to a second preferred embodiment of the present invention with reference to FIG. 4. A brake mechanism of the parking brake device 50 of the present embodiment includes brake portions provided on right and left wheels of the vehicle body, respectively. For the sake of convenience, only a brake portion 65 for the left wheel is shown in FIG. 4 and the other brake portion for the right wheel is not shown.

A brake lever 52 of the present embodiment is a toggle type brake lever, and an actuating portion of the brake lever 52 is a grip 54. Due to the toggle type brake lever 52, pull length of an inner cable 64 is set in a predetermined range. Specifically, a supporting shaft 53 is tiltably supported by a lever bracket 51, and the brake lever 52 is mounted on the supporting shaft 53.

The lever bracket 51 has an elongated hole 55 formed therein from the lower portion of the lever bracket 51 toward the supporting shaft 53. The lever bracket 51 has a first equalizer member 58 for moving along the elongated hole 55. The lever bracket 51 and the brake lever 52 have a link member 56 interposed therebetween, and the link member 56 is pivotally connected to the first equalizer member 58 and the brake lever 52 respectively through pins 57. The first equalizer member 58 has two equalizer holding portions 59 each of which holds a second equalizer member 60. In the present embodiment, the link member 56, the first equalizer member 58 and two of the second equalizer members 60 form a link mechanism.

Each of the second equalizer members 60 is basically formed in a similar manner to the first equalizer member 58, and has two cable holding portions 61. Two brake cables 62 are connected to each second equalizer member 60. Specifically, each brake cable 62 of the second embodiment is the same member as that of the first embodiment, and one end of an outer casing 63 of each brake cable 62 is fixed to an outer casing fixing portion 51a of the lever bracket 51. The other end of the outer casing 63 is fixed to an outer casing fixing portion of a bracket located near each brake portion. In FIG. 4, a bracket 69 formed near the brake portion 65 for the left wheel has an outer casing fixing portion 69a, and the other end of each outer casing 63 is fixed to the outer casing fixing portion 69a so as to extend through the outer casing fixing portion 69a.

One end of each inner cable 64 of the brake cables 62 is held by the corresponding cable holding portion 61 of the second equalizer member 60, and the other end of each inner cable 64 is held by a lever provided on the corresponding brake portion. In FIG. 4, only a lever 68 of the brake portion 65 is shown. In the present embodiment, the inner cables 64 held by one of the second equalizer members 60 are connected to the brake portion for the right wheel (not shown). The inner cables 64 held by the other of the second equalizer members 60 are connected to the brake portion 65 for the left wheel.

The brake portion 65 of the present embodiment includes a brake drum 66 and a brake shoe 67 which are rotated integrally with an axle (not shown) that serves as a drive system shaft member. When the levers 68 are pulled through the corresponding brake cables 62, the brake shoe 67 is pressed against the brake drum 66 to control the rotation of the axle. The brake portion for the right wheel (not shown) has the same structure as that for the left wheel.

In the present embodiment, when the grip 54 is operated to tilt the brake lever 52, each inner cable 64 is pulled through the link member 56, the first equalizer member 58 and the second equalizer members 60. The inner cables 64 held by one of the second equalizer members 60 are so operated that the brake 20 portion 65 for the left wheel becomes a braking state, and the inner cables 64 held by the other of the second equalizer members 60 are so operated that the brake portion for the right wheel becomes a braking state. That is, when the brake lever 52 is tilted, the right and left brake portions are simultaneously operated. In the parking brake device 50 of the present embodiment, even when a plurality of brake portions are provided with the parking brake device 50, a plurality of brake cables 62 are connected to each brake portion by using the first equalizer member 58 and the second equalizer members 60.

The present invention is not limited to the above-described embodiments, but may be variously modified within the scope of the purpose of the invention, as exemplified below.

Although the above-described embodiments are applied to the forklift truck that serves as the vehicle, the present invention is applicable to vehicles in general. Especially, the present invention is suitable for industrial vehicles such as loading vehicle and construction vehicle in which installation space for a brake cable is susceptible to restriction.

Although in the above-described embodiments a drum brake that serves as the brake mechanism is exemplified, for example, a disc brake may be used. As long as the brake mechanism serves as the parking brake device, the type and form of the brake mechanism are not restricted.

Although in the above-described embodiments the pull force of the brake lever is equally distributed into tensile force of two or four brake cables, in the present invention the number of brake cables may be two or more. In consideration of easiness of equal distribution, it is preferable that the number of brake cables is a multiple of two. Although it is practically preferable that the pull force is equally distributed in accordance with the number of brake cables, the pull force does not necessarily need to be equally distributed and the tensile force of the brake cables may be irregularly set.

Although in the above-described embodiments the pull force of the brake lever is equally distributed in accordance with the number of brake cables by using the equalizer member, the equalizer member does not necessarily need to be operated so that the pull force is equally distributed but may be operated so that the tensile force of each brake cable differs. When the tensile force of the brake cables may be irregularly set, for example, the ends of the brake cables may be directly connected to the brake lever without using the link member and the equalizer member.

Although in the above-described embodiments the brake cables have the same structure, for example, the brake cables having different diameter or length may be used. It is desirable that these differences should be held in such a range that the brake cables function normally.

Although illustrative embodiments of the present invention, and various modifications thereof, have been described in detail herein with reference to the accompanying drawings, it is to be understood that the invention is not limited to these precise embodiments and the described modifications, and that various changes and further modifications may be effected therein by one skilled in the art without departing from the scope or spirit of the invention as defined in the appended claims.

What is claimed is:

1. A parking brake device for a vehicle comprising:
   a lever bracket fixedly located near a driver seat of a body of the vehicle;

a brake lever tiltably supported by the lever bracket, the brake lever having a pedal, wherein the pedal of the brake lever is positioned so as to be different from the lever bracket in a width direction;

a brake mechanism for controlling rotation of a drive system shaft member in the body of the vehicle, wherein the brake mechanism includes brake portions located near right and left wheels of the body of the vehicle, respectively;

a plurality of brake cables for operating the brake mechanism by tilting motion of the brake lever, pull length of each brake cable caused by the tilting motion of the brake lever being set in a predetermined range; and a link mechanism connected to the brake lever so as to be displaced by the tilting motion of the brake lever, the link mechanism holding one end of each of the brake cables, wherein each of the brake cables simultaneously operates the brake mechanism by the tilting motion of the brake lever, wherein the link mechanism includes a link member which is driven by the tilting motion of the brake lever, a first equalizer member connected to the link member and a plurality of second equalizer members connected to the first equalizer member, wherein the first equalizer member has a plurality of equalizer holding portions each of which holding the corresponding second equalizer member, wherein each of the second equalizer members has a plurality of cable holding portions each of which holds one end of the corresponding brake cable, wherein the brake cables of one set of the second equalizer members are connected to the brake portion for the right wheel, wherein the brake cables of the other set of the second equalizer members are connected to the brake portion for the left wheel.

2. The parking brake device according to claim 1, wherein each of the brake cables includes a cylindrical outer casing which is mounted on the body of the vehicle and an inner cable which is inserted in the outer casing so as to be slidably moved along the outer casing.

3. The parking brake device according to claim 1, wherein the brake mechanism is a drum brake.

4. The parking brake device according to claim 1, wherein each of the brake cables has the same structure.

5. The parking brake device according to claim 1, wherein the number of brake cables is two.

* * * * *